US009547454B2

United States Patent
Dudgeon et al.

(10) Patent No.: US 9,547,454 B2
(45) Date of Patent: Jan. 17, 2017

(54) SELECTING FIRST DATA SETS IN A FIRST STORAGE GROUP TO SWAP WITH SECOND DATA SETS IN A SECOND STORAGE GROUP

(71) Applicant: International Business Machines Corporation, Armonk, NY (US)

(72) Inventors: Kyle B. Dudgeon, Vail, AZ (US); David C. Reed, Tucson, AZ (US); Esteban Rios, Tucson, AZ (US); Max D. Smith, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1 day.

(21) Appl. No.: 13/742,342

(22) Filed: Jan. 15, 2013

(65) Prior Publication Data

US 2014/0201487 A1    Jul. 17, 2014

(51) Int. Cl.
| | |
|---|---|
| *G06F 12/08* | (2016.01) |
| *G06F 9/46* | (2006.01) |
| *G06F 12/00* | (2006.01) |
| *G06F 3/06* | (2006.01) |

(52) U.S. Cl.
CPC ........... *G06F 3/0647* (2013.01); *G06F 3/0605* (2013.01); *G06F 3/067* (2013.01); *G06F 3/0608* (2013.01); *G06F 3/0653* (2013.01)

(58) Field of Classification Search
CPC .... G06F 3/0683; G06F 11/1412; G06F 12/02; G06F 12/08; G06F 17/3007; G06F 2212/7201; G06F 12/122; G06F 12/123; G06F 12/126; G06F 13/1657; G06F 13/28; G06F 17/30073
See application file for complete search history.

(56) References Cited

U.S. PATENT DOCUMENTS

| | | | | |
|---|---|---|---|---|
| 6,782,410 | B1 * | 8/2004 | Bhagat ................. | G06F 9/5027 709/201 |
| 7,017,011 | B2 * | 3/2006 | Lesmanne ............ | G06F 12/082 711/141 |
| 8,566,546 | B1 * | 10/2013 | Marshak .............. | G06F 3/0604 711/112 |
| 8,732,339 | B2 * | 5/2014 | Shin et al. ........................ | 710/3 |
| 8,990,527 | B1 * | 3/2015 | Linstead .............. | G06F 3/0617 711/161 |

(Continued)

OTHER PUBLICATIONS

IBM Corp., "DFSORT Tuning Guide", Version 1, Release 12 of z/OS, 1992, pp. 1-122, IBM Document No. SC26-7526-01.

(Continued)

*Primary Examiner* — Tuan Thai
*Assistant Examiner* — Mohamed Gebril
(74) *Attorney, Agent, or Firm* — David W. Victor; Konrad Raynes Davda & Victor LLP

(57) ABSTRACT

Provided are a computer program product, system, and method for selecting first data sets in a first storage group to swap with second data sets in a second storage group. First data sets are stored in a first storage group and second data sets are stored in a second storage group. A determination is made for a value for each of at least one of the first data sets based on at least one priority of at least one job processing I/O activity at the first data set. At least one of the first data sets for which the value was determined is selected to migrate to the second storage group based on the value.

24 Claims, 4 Drawing Sheets

(56) References Cited

U.S. PATENT DOCUMENTS

| | | | |
|---|---|---|---|
| 2004/0068621 A1* | 4/2004 | Van Doren | G06F 12/0828 711/144 |
| 2009/0094413 A1* | 4/2009 | Lehr | G06F 3/0605 711/112 |
| 2010/0125712 A1* | 5/2010 | Murase | G06F 11/1458 711/162 |
| 2010/0332780 A1* | 12/2010 | Furuya | G06F 3/0689 711/162 |
| 2011/0202735 A1* | 8/2011 | Kono | G06F 11/1451 711/162 |
| 2011/0307745 A1* | 12/2011 | McCune | G06F 17/30221 714/54 |
| 2012/0198107 A1* | 8/2012 | McKean | G06F 13/18 710/40 |
| 2012/0215949 A1 | 8/2012 | Chiu et al. | |
| 2013/0111129 A1* | 5/2013 | Maki | G06F 3/0611 711/117 |
| 2013/0152097 A1* | 6/2013 | Boctor | G06F 9/505 718/103 |
| 2013/0326270 A1* | 12/2013 | Chen | G06F 11/2089 714/6.21 |
| 2014/0201482 A1 | 7/2014 | Dudgeon et al. | |

OTHER PUBLICATIONS

Office Action dated Oct. 8, 2014, pp. 25, for U.S. Appl. No. 14/074,627, filed Nov. 7, 2013.
Response dated Jan. 8, 2015, pp. 7, to Office Action dated Oct. 8, 2014, pp. 25, for U.S. Appl. No. 14/074,627, filed Nov. 7, 2013.
Final Office Action dated Apr. 23, 2015, pp. 25, for U.S. Appl. No. 14/074,627, filed Nov. 7, 2013.
Response dated Jun. 10, 2015, pp. 8, to Final Office Action dated Apr. 23, 2015, pp. 25, for for U.S. Appl. No. 14/074,627, filed Nov. 7, 2013.
Office Action dated Oct. 8, 2015, pp. 20, for U.S. Appl. No. 14/074,627, filed Nov. 7, 2013.
Response to Office Action dated Dec. 17, 2015, pp. 7, for U.S. Appl. No. 14/074,627, filed Nov. 7, 2013.
Response dated Jun. 24, 2016, pp. 11, to Office Action dated Mar. 24, 2016, pp. 19, for U.S. Appl. No. 14/074,627, filed Nov. 7, 2013.
Office Action dated Mar. 24, 2016, pp. 19, for U.S. Appl. No. 14/074,627, filed Nov. 7, 2013.
Notice of Allowance dated Aug 9, 2016, pp. 16, for U.S. Appl. No. 14/074,627, filed Nov. 7, 2013.

\* cited by examiner

Data Set Information

Storage Group Information

I/O Activity Record

Job Priority Record

SELECTING FIRST DATA SETS IN A FIRST STORAGE GROUP TO SWAP WITH SECOND DATA SETS IN A SECOND STORAGE GROUP

BACKGROUND OF THE INVENTION

1. Field of the Invention

The present invention relates to a computer program product, system, and method for selecting first data sets in a first storage group to swap with second data sets in a second storage group.

2. Description of the Related Art

A policy based storage management framework specifies how data having certain characteristics is associated with different pools of storage space that will store such data, as well as how the data will be managed throughout its lifecycle. A policy based storage management framework provides constructs including data classes, storage classes, and management classes that are used to select storage devices and settings for a data set based on the characteristics of the data set. A data class specifies data set logical attributes, such as data file type, record length, logical data storage space requirements, expiration and retention dates for the data, etc. A storage class defines a set of storage services, such as random access specifications, sequential access specifications, guaranteed space, performance criteria, etc. A management class specifies availability and retention management requirements for data, such as hierarchical storage management (HSM), expiration, backup frequency, retention of backup copies, etc.

An automatic class selection (ACS) routine receives a request to create or access a data set and then selects and assigns data, storage, and management classes that apply to the data set based on characteristics of the data set, e.g., application that generated data set, data set name, date, owner of data set and/or application, etc. The final selection is of a storage group based on the data, storage, and management classes assigned to the data set. The storage group provides the allocation of physical storage space for the data sets Data sets can be members of one data class, but be assigned to different storage and/or management classes, which determine to which storage group the data file is assigned.

The ACS routine may determine the storage group for a data set based on a name of the data set. For instance, the name of a data set may be tied to an application, and the name may be used to determine the storage group of a data set.

SUMMARY

Provided are a computer program product, system, and method for selecting first data sets in a first storage group to swap with second data sets in a second storage group. First data sets are stored in a first storage group and second data sets are stored in a second storage group. A determination is made for a value for each of at least one of the first data sets based on at least one priority of at least one job processing I/O activity at the first data set. At least one of the first data sets for which the value was determined is selected to migrate to the second storage group based on the value.

DETAILED DESCRIPTION

Described embodiments provide techniques for selecting first data sets in a first storage to migrate to a second storage group that takes into account I/O activity and job priority of the I/O activity of the first data sets to migrate. If the second storage group does not have sufficient space to store selected first data sets from the first storage group, then second data sets in the second storage group may be selected to swap with the first data sets based on the I/O activity at the data sets in the first and second storage groups and the priority of jobs processing the I/O activity at the first and second data sets.

Figure 1:
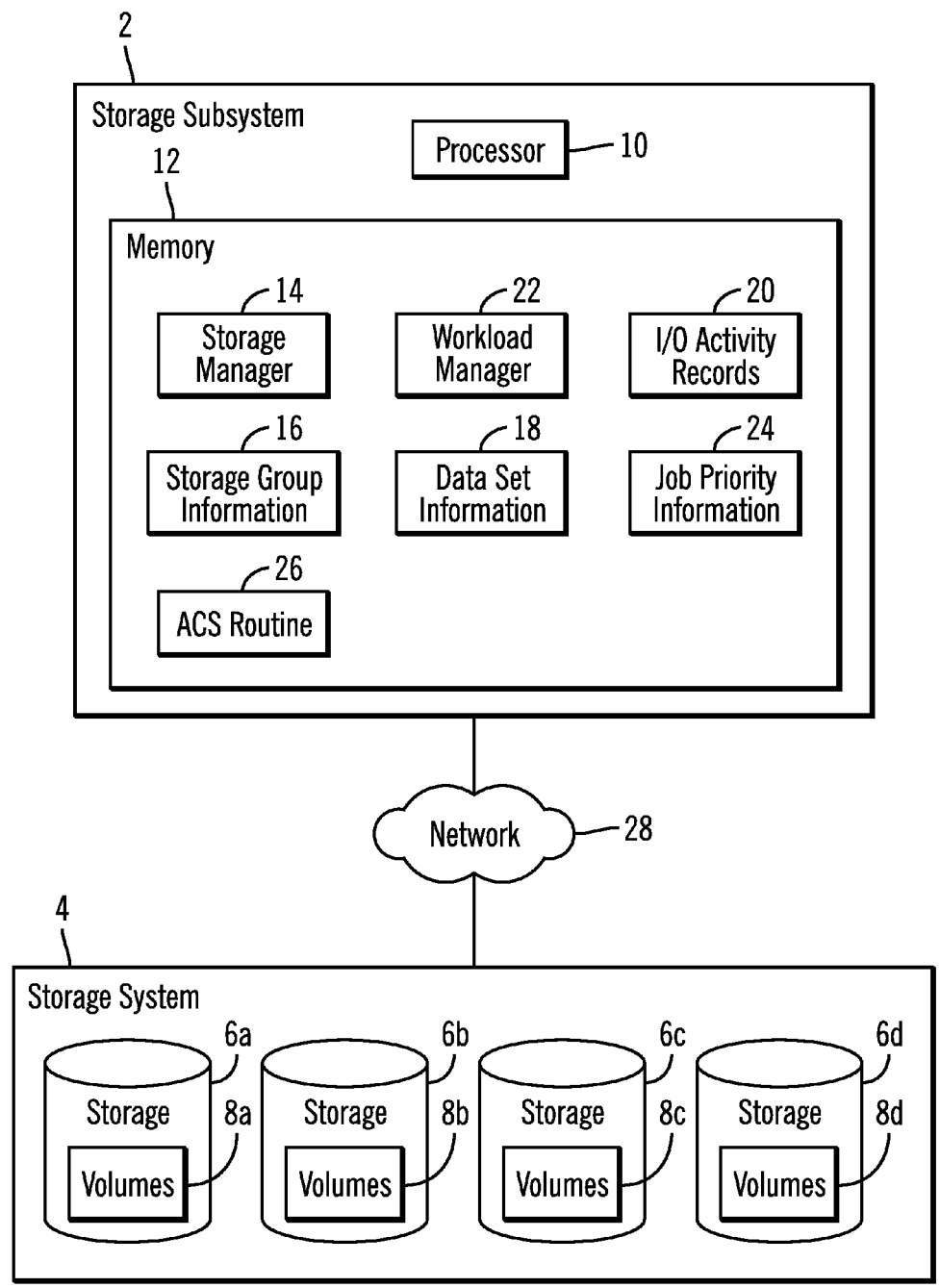
FIG. 1 illustrates an embodiment a computing environment.

FIG. 1 illustrates an embodiment of a storage subsystem 2 providing Input/Output ("I/O") access to a storage system 4 having a plurality of storages 6a, 6b, 6c, 6d each having volumes 8a, 8b, 8c, 8d. The storage subsystem 2 includes a processor 10 and memory 12. The memory 12 includes a storage manager 14 that manages migration and recall of data sets in the volumes 8a, 8b, 8c, 8d and selects storage resources to store the data sets. The memory 12 stores data structures used by the storage manager 14, including storage group information 16 having information on storage attributes of the storages 6a, 6b, 6c, 6d and volumes 8a, 8b, 8c, 8d, such as performance, I/O throughput, Redundant Array of Independent Disk (RAID) configuration, striping configuration, redundancy, etc.; data set information 18 on the data sets in the volumes, including attributes and classes assigned to the data sets, such as a data class, storage class and management class, and I/O activity at the data set; and I/O activity records 20 having information on I/O activity at the data sets.

The storage manager 14 may communicate with a workload manager 22, which manages the assignment of jobs to handle I/O activity to the data sets. The workload manager 22 assigns priorities to the jobs assigned to the I/O activity for the data sets, which is indicated in the job priority information 24. The storage manager 14 and workload manager 22 may be components of an operating system known in the art, such as the International Business Machines ("IBM®") Z/OS® operating system. (IBM and Z/OS are trademarks of IBM in the United States and foreign countries). In z/OS embodiments, the storage manager 14 may determine I/O activity 20 information from System Management Facility (SMF) records. Alternatively, the storage manager 14 may comprise a separate storage facility of the operating system, such as the IBM Data Facility Storage Management Subsystem (DFSMS). DFSMS provides an operating environment to automate and centralize the management of storage, data management program, management device management.

Figure 2:
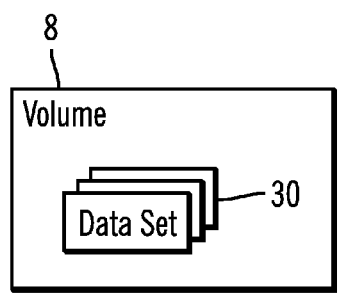
FIG. 2 illustrates an embodiment of a volume.

FIG. 2 illustrates how a volume 8, such as volumes 8a, 8b, 8c, 8d, include one or more data sets 30. A data set 30 is comprised of a number of extents of storage locations assigned to the data set. The data sets 30 may be indexed according to a primary key that is used to locate records in the data set 30.

A data set 30 is associated with attributes that represent properties and characteristics of the managed environment (e.g. capacity of a disk, throughput rates, unused space, I/O activity). Attributes may be intrinsic (static) and dynamic (time-varying). Intrinsic attributes do not change with time and hence they can be referenced but not reset. Dynamic attributes can be referenced and can be reset.

A data class specifies data attributes of the data set, such as the data's life cycle, recoverability, security, number of extents in the data set, whether the data set is to be allocated in the extended format, whether the data set is a hierarchical file system (HFS) data set, a data set record format, the record length, a primary allocation of records, a secondary allocation of records, dynamic volume count (the maximum number of volumes a data set can span), etc.

Storage classes are a list of storage objectives and requirements that represent a list of services available to data sets. A storage class does not represent a physical storage, but provides the criteria the storage manager 14 uses to determine the physical storage to allocate to store the data set. Storage classes concern the partitioning and use of storage space, the topology of storage within an enterprise, and the management of the storage components themselves. Storage attributes may provide requirements on the storage device, or the storage systems (e.g., a number of storage devices packaged as a system), data striping across RAID arrays, allocation of a volume that supports concurrent copy, virtual copies, specific "snapshot" implementations, dynamic defragmentation/garbage collection, on-board cache management, performance-based capacity control, etc.). Storage attributes that are device related include capacity, bandwidth, I/O rates, sequential/direct, reliability/error rates, concurrent copy capability, physical location, security, lease duration, cost, etc. The storage class assigned to a data set can be used to select a storage group from which a volume is selected to store the data set. A storage group represents the physical storage, such as collections of hard disk drives including volumes, volumes in tape libraries, etc. Thus, the storage class attributes can be used to select a storage group having storage attributes that satisfy the requirements of the storage class.

A management class indicates how to manage the data in the data set 30, such as attributes concerning migration, backup, retention, expiration, frequency of backup, whether unused space in the data set is allocated to the data set or unallocated and only allocated when needed.

The storage manager 14 may implement an automatic class selection (ACS) 26 routine that receives a request to create or access a data set 30 and then selects and assigns data, storage, and management classes that apply to the data set 30 based on characteristics of the data set 30, e.g., application that generated data file, file name, date, owner of file and/or application, etc. A storage group for a data set 30 is selected based on the data, storage, and management classes assigned to the data. The storage group provides the allocation of physical storage space for the data file. Data sets 30 can be members of one data class, but be assigned to different storage and/or management classes, which determine to which storage group the data file is assigned.

The storage subsystem 2 may communicate with the storages 6a, 6b, 6c, 6d over a network 28, such as a local area network (LAN), storage area network (SAN), wireless network, peer-to-peer network, the Internet, and Intranet, direct connections, bus interface, etc.

The storage subsystem 2 may comprise a storage server, such as an enterprise storage server, a workstation, etc. Each storage 6a, 6b, 6c, 6d may each comprise one or more storage devices, where the storage devices may comprise a solid state storage device comprised of solid state electronics, such as a EEPROM (Electrically Erasable Programmable Read-Only Memory), flash memory, flash disk, storage-class memory (SCM), etc., magnetic storage disk, an array of disks, optical disk, tape, etc. The storages 6a, 6b, 6c, 6d may be implemented in a distributed storage environment or network storage environment, such as "cloud" storage. Alternatively, the storages 6a, 6b, 6c, 6d may be implemented at a single location.

The memory 12 may comprise one or more volatile or non-volatile memory devices. such as a Dynamic Random Access Memory (DRAM), Random Access Memory (RAM) or a non-volatile memory, e.g., battery backed-up Random Access Memory (RAM), static RAM (SRAM), solid state storage devices (SSDs), etc.

The storage manager 14 may be implemented as code in a computer readable storage medium executed by a processor 10 as shown in FIG. 1. Alternatively, the storage manager 14 may be implemented with hardware logic, such as an Application Specific Integrated Circuit (ASIC).

Figure 3:
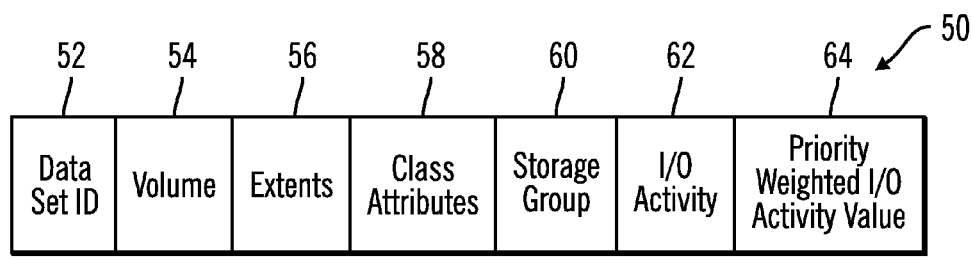
FIG. 3 illustrates an embodiment of data set information.

FIG. 3 illustrates an embodiment of an instance of data set information 50 for one data set 30 the storage manager 14 maintains in the data set information 18. A data set identifier (ID) 52 identifies the data set 30; a volume field 54 indicates the volume 8a, 8b, 8c, 8d in which the data set 52 is stored; the extents 56 indicate the extents of the data set 52; class attributes 58 indicate the storage class, management class and storage class assigned to the data set 52; storage group 60 indicates a storage group to which the data set 52 is assigned based on the requirements and attributes specified by the class attributes, such as a storage class; I/O activity 62 indicates current I/O activity at the data set 52; and a priority weighted I/O activity value 64, also referred to as a value, indicates I/O activity weighted by a priority of the jobs assigned to handle the I/O activity at the data set 52.

The ACS routine 26 is programmed to assign the storage group 60 to the data set 52 based on the class attributes 58 of the data set. Changes to the I/O activity 62 and a calculated priority weighted I/O activity value 64 may change the assignment of the storage group 60 to the data set 52.

Figure 4:
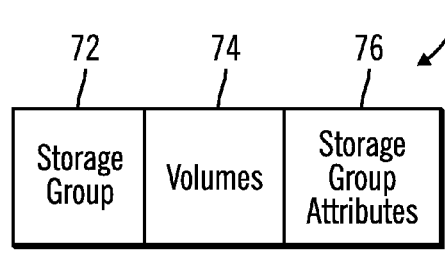
FIG. 4 illustrates an embodiment of storage group information.

FIG. 4 illustrates an embodiment of an instance of storage group information 70 for one storage group the storage manager 14 maintains in the storage group information 18. The storage group information 70 for one storage group includes a storage group identifier 72, volumes 74 associated with the storage group, and storage group attributes 76 providing storage attributes and requirements satisfied by the volumes 74 assigned to the storage group 72. For instance, a first tier, highest performance, storage group may be implemented with high performance storage devices, such as SSDs, a second tier storage group may be implemented with a medium level of performance storage devices, such as hard disk drives, which are generally less expensive and lower performing than SSDs, and a third tier storage group may be implemented with a lowest level of performing storage drives, such as tape drives or slow access hard disk drives.

Figure 5:
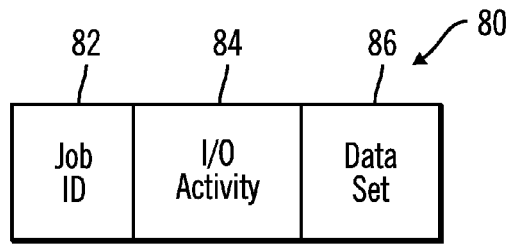
FIG. 5 illustrates an embodiment of an I/O activity record.

FIG. 5 illustrates an embodiment of an instance 80 of the I/O activity records 20 the storage manager 14 may access to determine I/O activity information for the data sets 30. The I/O activity record 80 includes a job identifier (ID) 82 indicating a job processing I/O activity 84 toward data set 86.

Figure 6:
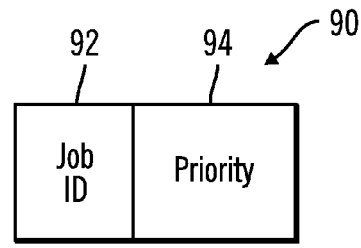
FIG. 6 illustrates an embodiment of a job priority record.

FIG. 6 illustrates an embodiment of a job priority record instance 90 of the job priority information 24 generated by the workload manager 22 including a job identifier 92 and a priority 94 assigned to the job identifier 92. In one embodiment, a higher priority value indicates a higher priority job and a lower value indicates a lower priority job. In alternative embodiments, different relative values may be used to indicate different relative priorities.

Further embodiments of the data set information 50 (FIG. 3), storage group information 70 (FIG. 4), I/O activity record 80 (FIG. 5), and the job priority record 90 (FIG. 6) may include additional and different information than shown in FIGS. 3, 4, 5, and 6, and may not include certain of the information shown in FIGS. 3-6. Further the information in the data structures shown in FIGS. 3, 4, and 5 may be presented in a different arrangement of data structures and records than shown.

Figure 7A:
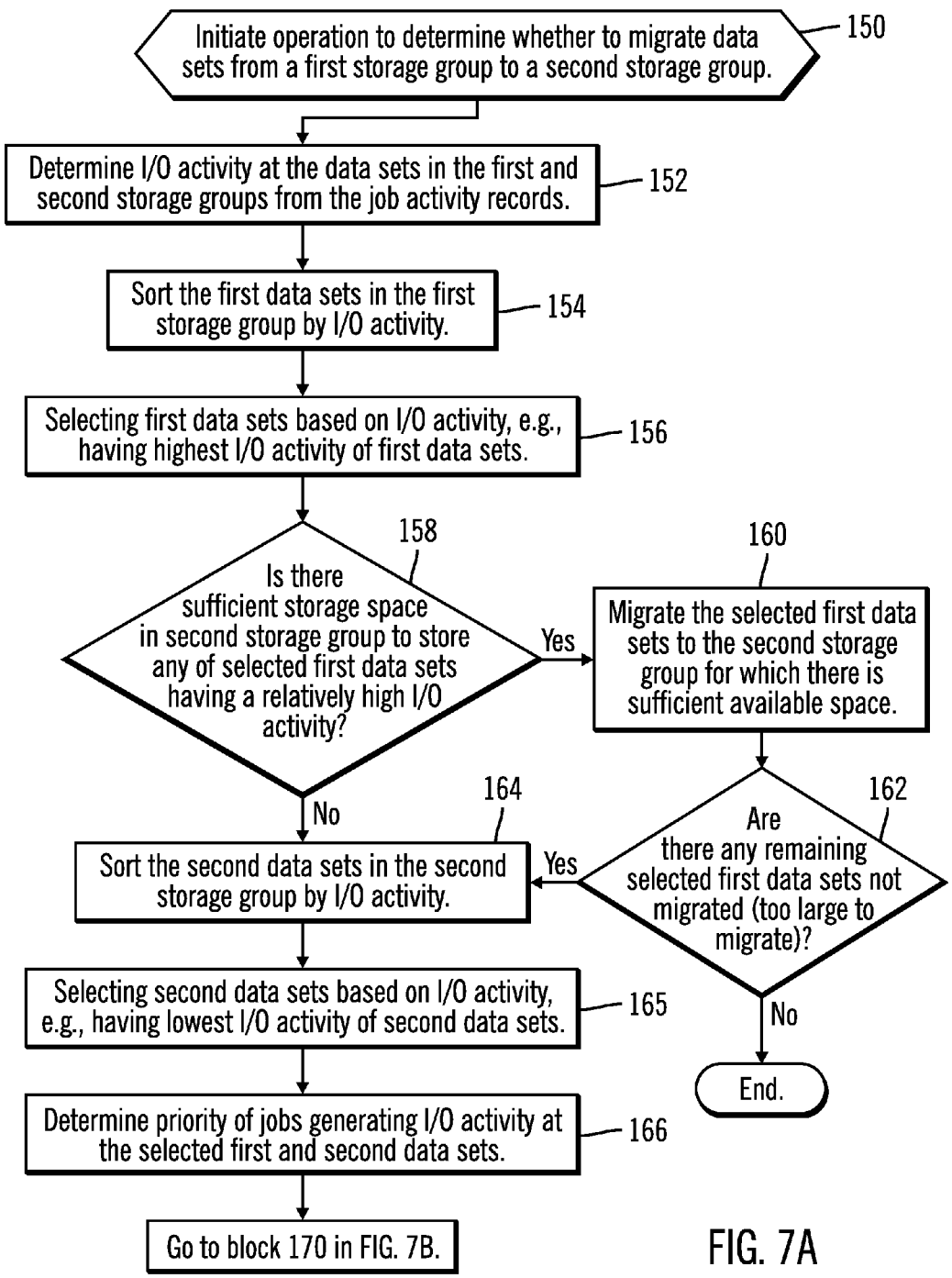
FIGS. 7a and 7b illustrate an embodiment of operations to select data sets to migrate.
Figure 7B:
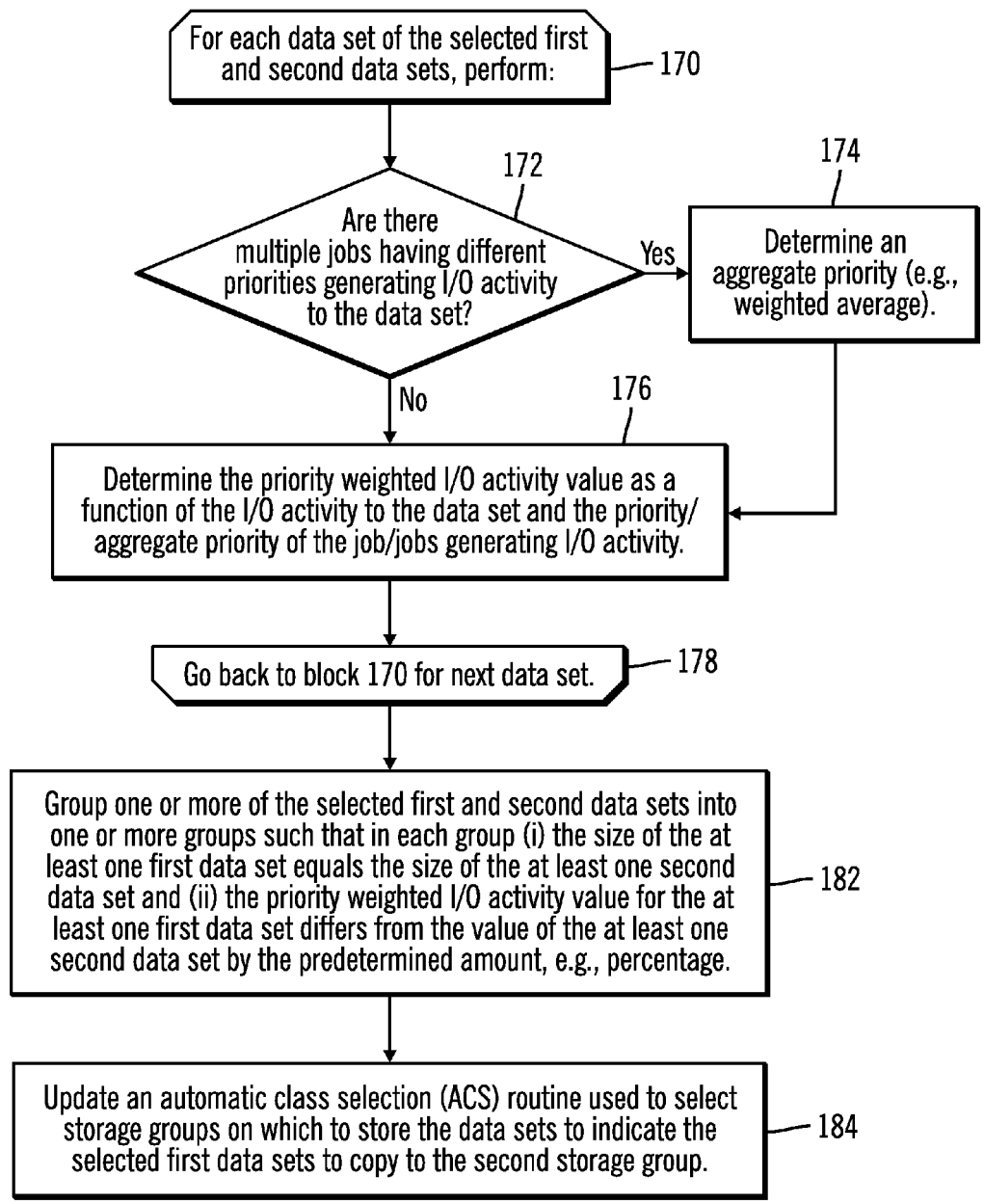

FIGS. 7a and 7b illustrate an embodiment of operations performed by the storage manager 14 to determine whether to promote a data set 30 from a first storage group to a second storage group, such as a higher performing storage group. The operations of FIGS. 7a and 7b may be performed for each storage group and next higher performing storage group to determine data sets that may be promoted to the higher performing storage group. For instance, if there are three tiers of storage, e.g., level one (highest performing), level two, and level three (lowest performing), then the operations may be performed for the data sets 30 in the level two storage group to promote to the level one storage group and performed for the data sets 30 in the level three storage group to migrate to the level two storage group.

Upon initiating (at block 150) the operations to determine whether to migrate first data sets from a first storage group to a next higher performing second storage group, i.e., having higher performing storage devices (e.g., from hard disk drives to SSD drives, from tape cartridges to hard disk drives), the storage manager 14 determines (at block 152) I/O activity at first data sets 30 in the first storage group and second data sets in a next highest performing second storage group from the job activity records 20. The storage manager 14 may sum the I/O activity 84 in the I/O activity records 80 for each of the first and second data sets in the first and second storage groups, respectively, and update the I/O activity 62 in the data set information 50 for each of the first and second data sets considered to reflect current I/O activity. The storage manager 14 may then sort (at block 154) the first data sets in the first storage group by I/O activity. The storage manager 14 may then select first data sets based on I/O activity, such as a group of the first data sets having the highest I/O activity of the first data sets. For instance, the storage manager 14 may select a certain percent of data sets having the highest I/O activity, e.g., top 10 percent of I/O activity.

If (at block 158) there is sufficient storage space in the second storage group to store any of selected first data sets having a relatively high I/O priority, then the storage manager 14 migrates (at block 160) some or all of the selected first data sets to the second storage group for which there is sufficient available space. In selecting a subset of the first data sets to migrate, if there is not sufficient storage space in the second storage group for all the selected first data sets, the storage manager 14 may prefer migrating the first data sets having a highest relative I/O activity. If (from the no branch of block 162) all first data sets were migrated at block 160, then control ends. Otherwise, if (from the yes branch at block 162) there are remaining selected first data sets not migrated, such as too large to migrate, or if (from the no branch of block 158) there is not sufficient storage space in the second storage group to migrate any of the selected first data sets, then control proceeds to block 164 et seq. to determine second data sets in the second storage group to swap with the selected first data sets.

At block 164, the storage manager 14 sorts the second data sets in the second storage group by the determined priority weighted I/O activity value 64. The storage manager 14 may then select (at block 165) second data sets based on the priority weighted I/O activity value 64, such as second data sets having lowest value 64 of second data sets. For instance, the storage manager 14 may select a certain percent of data sets having the lowest I/O activity, e.g., lowest 10 percent of I/O activity. In this way data sets having low I/O activity in the higher performing storage group are selected to swap with data sets in the lower performing storage group. The storage manager 14 then determines (at block 166) the priority of jobs generating I/O activity at the selected first and second data sets. In one embodiment, the storage manager 14 may query the workload manager 22 to determine the priority 94 of the jobs 92 processing the I/O activity. From block 166, control proceeds to block 170 in FIG. 7b.

With respect to FIG. 7b, the storage manager 14 performs a loop of operations (at blokes 170-178 for each data set to determine the weighted I/O activity, weighted by job priority. For each data set of the selected first and second data sets, the storage manager 14 determines (at block 172) whether there are multiple jobs 82 having different priorities 94 generating I/O activity 84 to the data set. If (at block 172) there are multiple jobs handling I/O activity at different priorities for one data set 30, then the storage manager 14 determines (at block 174) an aggregate priority, which may comprise a weighted average priority of the priorities 94 weighted by an amount of their corresponding I/O activity. From block 174 or if there is only one job managing the I/O activity (from the no branch of block 172), the storage manager 14 determines (at block 176) the weighted priority as a function of the I/O activity to the data set and the priority/aggregate priority of the job/jobs generating I/O activity. For instance, in one embodiment, the priority weighted I/O activity 64 may be calculated by multiplying the I/O activity times the job priority, where a higher job priority value 90 indicates a higher priority. In alternative embodiments, other operations and calculations may be used to calculate the priority weighted I/O activity value 64.

After determining the values 64 for the selected first and second data sets, the storage manager 14 may group (at block 182) one or more of the selected first data sets and one or more of the second data sets into one or more groups such that in each group (i) the size of the at least one first data set equals the size of the at least one second data set and (ii) the weighted priority for the at least one first data set differs from the weighted priority of the at least one second data set by the predetermined amount, e.g., percentage.

In one embodiment, the determination may form groups such that in each group each of the at least one first data set being swapped with each of the at least one second data set differs by the predetermined amount, e.g., percentage, such that each first and second data sets satisfy the condition with respect to every other second and first data sets, respectively. In a further embodiment, a cumulative priority weighted I/O activity value for the first data set and a cumulative value for the second data set may be compared to determine if their cumulative priority weighed I/O activity values differ by the predetermined amount or percentage.

In one embodiment, groups may be formed of one or more first data sets and one or more second data sets so as to maximize the number of the selected first and second data sets that are swapped. In a further embodiment, the storage manager 14 may try to form groups by first considering selected first data sets having a highest I/O activity and second data sets having a lowest I/O activity to include in the same group. Other optimization and minimum/maximum calculation techniques may be used to form groups of first and second data sets that maximize the number of the first and second data sets that are swapped and that satisfy the condition that the priority weighted I/O activity values differ by the predetermined amount/percentage.

In the described embodiments, data sets are first selected based on I/O activity and then a second selection of first data sets to migrate or swap are determined based on the priority weighted I/O activity values of the first and second data sets first selected according to I/O activity. In an alternative embodiment, the priority weighted I/O activity value may be determined for each data set in the first and second groups and then first data sets to consider for migrating or swapping may be selected based on the priority weighted I/O activity value. For instance, the first data sets selected may comprise first data sets having a highest priority weighted activity value and second data sets selected may comprise second data sets having a lowest value.

After determining the first data sets to migrate or swap with second data sets, the storage manager 14 may update (at block 184) the ACS routine 26 to indicate the first data sets to migrate or swap from the first storage group to the second storage group. The storage manager 14 may further update the storage group 60 of the selected first data set to migrate or swap to the second storage group and update the storage group 60 of any second data sets involved in swapping to indicate the first storage group. In such case, when the ACS routine 26 is updated, the first data sets are migrated or swapped with the second data sets determined according to the operations of FIGS. 7*a* and 7*b*. In an alternative embodiment, the storage manager 14 may migrate or swap the determined first data sets immediately and also update the storage group 60 information for the first and second data sets involved to indicate the new storage group 60 to which the data sets are assigned.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, an application specific integrated circuit (ASIC), a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for assigning data sets to storage groups, the computer program product comprising a non-transitory computer readable storage medium having computer readable program code embodied therein that executes to perform operations, the operations comprising:
    storing first data sets in a first storage group;
    storing second data sets in a second storage group;
    processing I/O activity records for jobs each indicating I/O activity for one of the jobs toward the first data sets to determine the I/O activity for the jobs toward the first data sets;
    processing job priority records indicating a priority assigned to each of the jobs;
    determining values, at least one value for each of the first data sets, by multiplying, for each of the first data sets, the I/O activity at a first data set of the data sets, indicated in the processed I/O activity records for the first data set, and the priority of the jobs assigned to handle the I/O activity to the first data set, indicated in the processed job priority records; and
    selecting at least one of the first data sets for which at least one of the values were determined to migrate to the second storage group based on the determined at least one of the values.

2. The computer program product of claim 1, wherein the selected at least one of the first data sets has a higher I/O activity relative to the first data sets not selected, wherein the second storage group is implemented in higher performance storage devices than storage devices in which the first storage group is implemented.

3. The computer program product of claim 1, wherein the determining the value for each of the at least one of the first data sets further comprises:
    determining multiple priorities of multiple jobs generating the I/O activity of the first data sets; and
    determining an aggregate priority based on the multiple priorities, wherein the determined value is based on the I/O activity and the aggregate priority.

4. The computer program product of claim 1, wherein the selecting the at least one of the first data sets comprises a first selecting, wherein the operations further comprise:
    determining whether the first storage group has available space to store the at least one of the first data sets; and
    performing a second selecting of at least one of the first data sets based on the I/O activity of the at least one of the first data sets to migrate to the second storage group in response to determining the second storage group has the available space.

5. The computer program product of claim 4, wherein the first selecting is performed in response to determining the second storage group does not have the available space.

6. The computer program product of claim 1, wherein the operations further comprise:
    selecting a set of at least one of the first data sets based on the I/O activity at the first data sets, wherein the at least one of the first data sets selected based on the at least one of the values is selected from the set of the at least one of the first data sets.

7. The computer program product of claim 1, wherein the operations further comprise:
determining a value for each of at least one of the second data sets based on at least one priority of at least one job processing I/O activity at the second data sets; and
using the values determined for the first and the second data sets to select at least one of the second data sets to swap with the selected at least one of the first data sets.

8. The computer program product of claim 7, wherein the using the values comprises:
determining whether the values determined for the at least one of the first data sets differ from the values for the at least one of the second data sets by a predetermined amount, wherein the selected first and second data sets to swap have values that differ by the predetermined amount.

9. The computer program product of claim 7, wherein the selected at least one of the first data sets to swap has higher I/O activity than the first data sets not selected to swap and wherein the selected at least one of the second data sets has lower I/O activity than the second data sets not selected to swap.

10. The computer program product of claim 7, wherein the operations further comprise:
grouping one or more of the selected first and second data sets into one or more groups such that in each group (i) a size of the at least one of the first data sets equals the size of the at least one of the second data sets and (ii) at least one value of the at least one of the first data sets differs from the at least one value of the at least one of the second data sets by a predetermined amount, wherein the at least one first and second data sets selected to swap are in a same of the groups.

11. The computer program product of claim 1, wherein the operations further comprise:
updating an automatic class selection (ACS) routine used to select storage groups on which to store the data sets to indicate the selected at least one of the first data sets to copy to the second storage group, wherein the ACS routine controls the storage of the first data sets in the first storage group and the second data sets in the second storage group and the migrating of the selected at least one of the first data sets to the second storage group.

12. The computer program product of claim 1, wherein the operations further comprise:
storing third data sets in a third storage group;
determining a value for each of at least one of the second data sets based on at least one priority of at least one job processing I/O activity at the second data set; and
selecting at least one of the second data sets for which the value was determined to migrate to the third storage group based on the values.

13. A system for assigning data sets to storage groups in a storage system, comprising: a processor; and a non-transitory computer readable storage medium having code executed but the processor to perform operations comprising: storing first data sets in a first storage group; storing second data sets in a second storage group; processing I/O activity records for jobs each indicating I/O activity for one of the jobs toward the first data sets to determine the I/O activity for the jobs toward the first data sets;
processing job priority records indicating a priority assigned to each of the jobs;
determining values, at least one value for each of the first data sets, by multiplying, for each of the first data sets, the I/O activity at a first data set of the data sets, indicated in the processed I/O activity records for the first data set, and the priority of the jobs assigned to handle the I/O activity to the first data set, indicated in the processed job priority records; and selecting at least one of the first data sets for which at least one of the values were determined to migrate the second storage group based on the determined at least one of the values.

14. The system of claim 13, wherein the selected at least one of the first data sets has a higher I/O activity relative to the first data sets not selected, wherein the second storage group is implemented in higher performance storage devices than storage devices in which the first storage group is implemented.

15. The system of claim 13, wherein the operations further comprise:
determining a value for each of at least one of the second data sets based on at least one priority of at least one job processing I/O activity at the second data sets; and
using the values determined for the first and the second data sets to select at least one of the second data sets to swap with the selected at least one of the first data sets.

16. The system of claim 15, wherein the using the values comprises:
determining whether the values determined for the at least one of the first data sets differ from the values for the at least one of the second data sets by a predetermined amount, wherein the selected first and second data sets to swap have values that differ by the predetermined amount.

17. The system of claim 15, wherein the operations further comprise:
grouping one or more of the selected first and second data sets into one or more groups such that in each group (i) a size of the at least one of the first data sets set equals the size of the at least one of the second data sets and (ii) at least one value of the at least one of the first data sets differs from the at least one value of the at least one of the second data sets by a predetermined amount, wherein the at least one first and second data sets selected to swap are in a same of the groups.

18. The system of claim 13, wherein the operations further comprise:
updating an automatic class selection (ACS) routine used to select storage groups on which to store the data sets to indicate the selected at least one of the first data sets to copy to the second storage group, wherein the ACS routine controls the storage of the first data sets in the first storage group and the second data sets in the second storage group and the migrating of the selected at least one of the first data sets to the second storage group.

19. The system of claim 13, wherein the determining the value for each of the at least one of the first data sets further comprises:
determining multiple priorities of multiple jobs generating the I/O activity of the first data sets; and
determining an aggregate priority based on the multiple priorities, wherein the determined value is based on the I/O activity and the aggregate priority.

20. The system of claim 13, wherein the selecting the at least one of the first data sets comprises a first selecting, wherein the operations further comprise:

determining whether the first storage group has available space to store the at least one of the first data sets; and performing a second selecting of at least one of the first data sets based on the I/O activity of the at least one of the first data sets to migrate to the second storage group in response to determining the second storage group has the available space.

21. The system of claim 20, wherein the first selecting is performed in response to determining the second storage group does not have the available space.

22. The system of claim 15, wherein the operations further comprise:

selecting a set of at least one of the first data sets based on the I/O activity at the first data sets, wherein the at least one of the first data sets selected based on the at least one of the values is selected from the set of the at least one first data set.

23. The system of claim 15, wherein the selected at least one of the first data sets to swap has higher I/O activity than the first data sets not selected to swap and wherein the selected at least one of the second data sets has lower I/O activity than the second data sets not selected to swap.

24. The system of claim 13, further comprising:

storing third data sets in a third storage group;

determining a value for each of at least one of the second data sets based on at least one priority of at least one job processing I/O activity at the second data set; and selecting at least one of the second data sets for which the value was determined to migrate to the third storage group based on the values.

* * * * *